(12) United States Patent
Gloor et al.

(10) Patent No.: US 7,810,521 B2
(45) Date of Patent: Oct. 12, 2010

(54) SANITARY FITTING

(75) Inventors: Herbert Gloor, Unterkulm (CH);
Hans-Ulrich Alder, Mooslerau (CH)

(73) Assignee: KWC AG, Unterkulm (CH)

( * ) Notice: Subject to any disclaimer, the term of this patent is extended or adjusted under 35 U.S.C. 154(b) by 400 days.

(21) Appl. No.: 11/976,174

(22) Filed: Oct. 22, 2007

(65) Prior Publication Data

US 2008/0105313 A1 May 8, 2008

(30) Foreign Application Priority Data

Nov. 2, 2006 (EP) .................................. 06022772

(51) Int. Cl.
*E03C 1/02* (2006.01)
(52) U.S. Cl. .................. 137/636; 137/625.4; 137/454.5
(58) Field of Classification Search ................. 137/636, 137/454.2, 454.5, 625.4, 801
See application file for complete search history.

(56) References Cited

U.S. PATENT DOCUMENTS

| 5,417,348 | A | | 5/1995 | Perrin et al. |
| 5,657,791 | A | | 8/1997 | Graber |
| 5,720,316 | A | * | 2/1998 | Simotti ..................... 137/454.2 |
| 5,730,184 | A | | 3/1998 | Monch |
| 6,390,128 | B1 | | 5/2002 | Tung |
| 6,631,735 | B2 | * | 10/2003 | Gloor ......................... 137/801 |
| 6,959,729 | B2 | | 11/2005 | Graber |
| 2002/0117220 | A1 | | 8/2002 | Gloor |
| 2006/0124181 | A1 | | 6/2006 | Chen |

FOREIGN PATENT DOCUMENTS

| DE | 201 06 658 U1 | 7/2001 |
| EP | 0 447 777 A1 | 9/1991 |
| EP | 0 616 156 A1 | 9/1994 |
| EP | 1 234 917 A1 | 8/2002 |
| GB | 2 300 898 A | 11/1996 |
| WO | WO 94/19633 A1 | 9/1994 |

* cited by examiner

*Primary Examiner*—Kevin L Lee
(74) *Attorney, Agent, or Firm*—Oliff & Berridge, PLC

(57) ABSTRACT

Sanitary fitting (10, 10A) with an outlet (38) and a first supply line connection (74) connected hydraulically thereto and capable of being connected to a first source of liquid, with a pilot valve arrangement (48) arranged hydraulically between the first supply line connection (74) and the outlet (38), and with a second supply line connection (76) capable of being connected to a second source of liquid. The sanitary fitting (10, 10A) also exhibits a control device (50), which is connected on the inlet side to the first and the second supply line connection (74, 76) and on the outlet side to the pilot valve arrangement (48), the pilot valve arrangement (48) being permanently connected by hydraulic means via the control device (50) to at least the first supply line connection (74) or the second supply line connection (76).

11 Claims, 6 Drawing Sheets

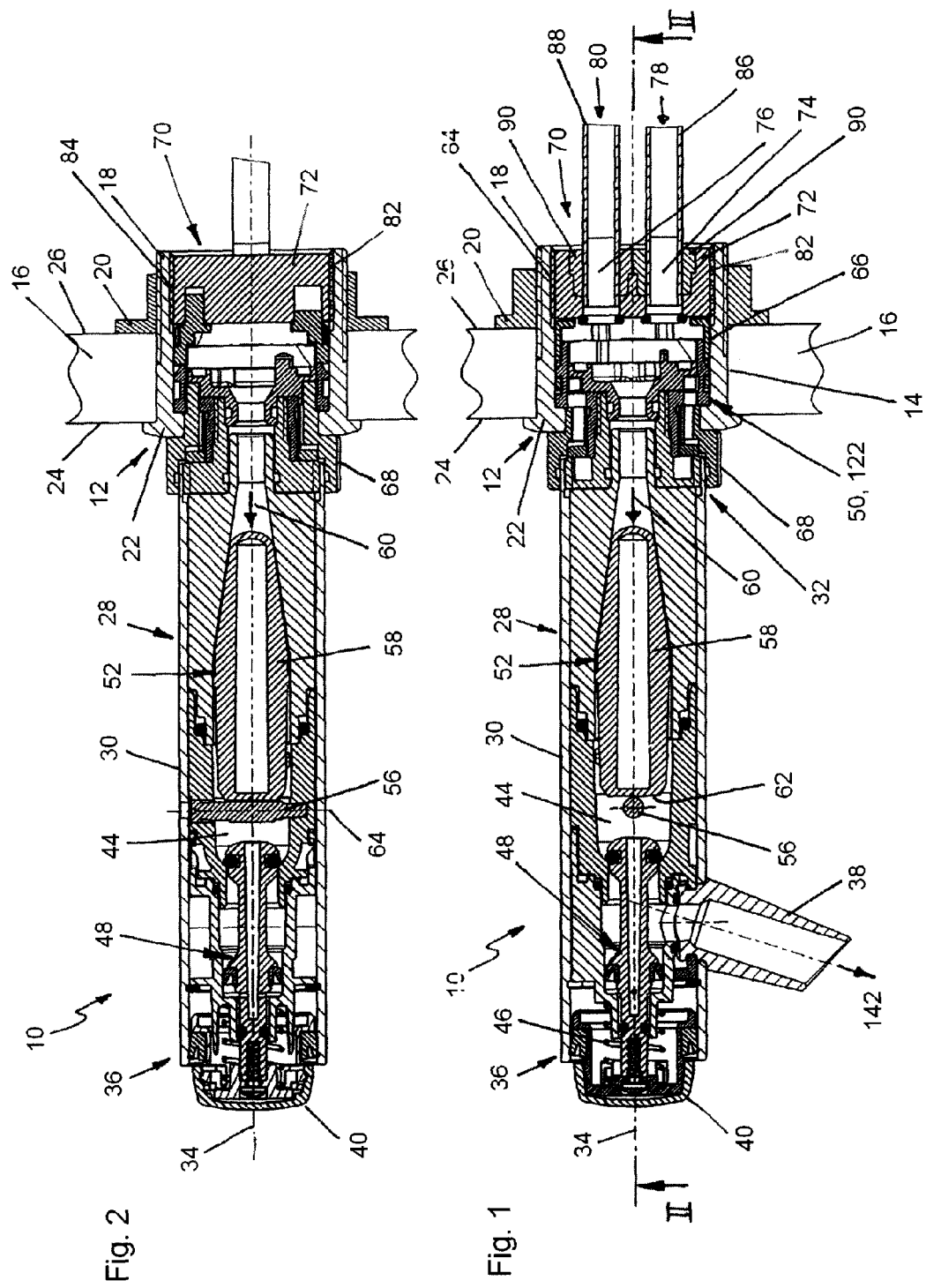

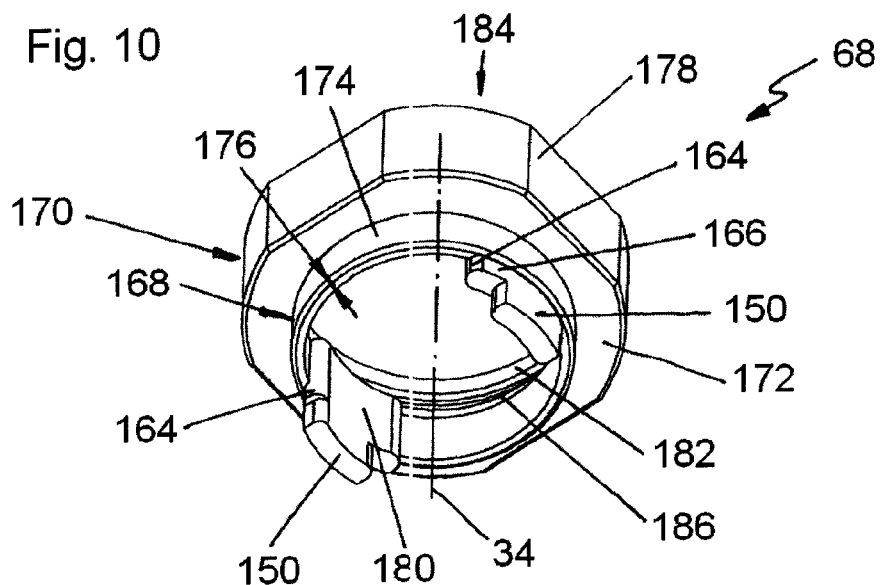
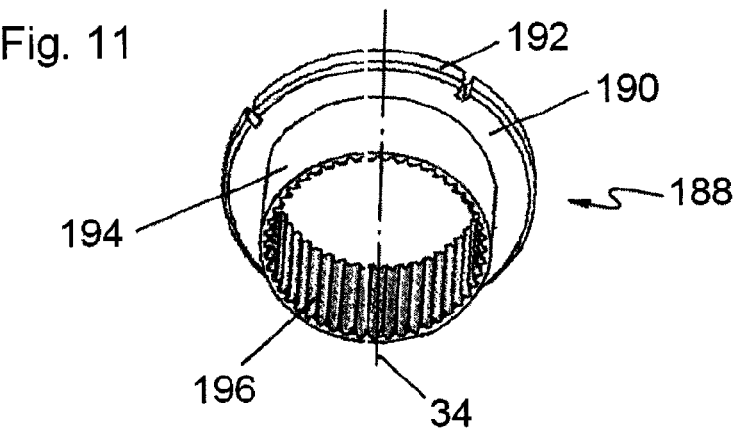
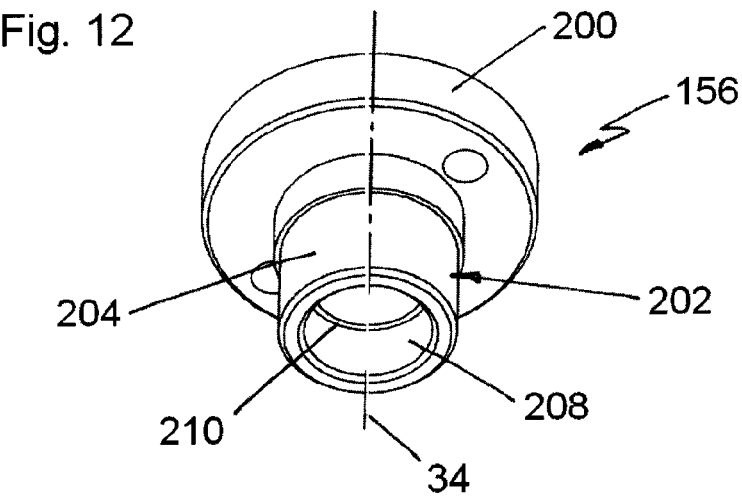

SANITARY FITTING

BACKGROUND OF THE INVENTION

The present invention relates to a sanitary fitting according to the preamble to claim 1 and to an application for such a sanitary fitting according to claim 10.

A sanitary fitting previously disclosed in EP-A-1234917 exhibits two mutually separate outlet pipes for the discharge of two different water qualities. A first outlet pipe is connected hydraulically for this purpose via a first channel system to a first source of liquid. The discharge of the first liquid is controlled via an actuating element that is connected to a pilot valve arrangement provided in the inside of a fitting housing. The presence of this pilot valve arrangement eliminates the need to overcome the full liquid pressure of the first liquid, but only a fraction thereof, in conjunction with the operation of this sanitary fitting. A second outlet pipe is connected hydraulically via a second channel system and a control device for the purpose of mixing the additional liquids supplied by a cold-water pipe and a hot-water pipe.

Previously disclosed in EP-A-0616156 is a further sanitary fitting with a control cartridge for a single-lever mixer tap. The control cartridge exhibits a first control disc fixed to the housing and a second control disc capable of being caused to rotate by means of an actuating lever, both of which discs are retained in a cartridge housing. The ceramic control discs each have two orifices for cold water and hot water. Rotation of the second control disc relative to the first control disc that is fixed to the housing initially causes the flow of cold water and the flow of hot water to be opened one after the other, whereupon the flow of cold water is restricted. The following conditions thus result from a rotating movement of the actuating lever: off-cold-mixed-hot.

SUMMARY OF THE INVENTION

The object of the present invention is to make available a sanitary fitting in which the discharge of a mixed quality of liquids via an outlet is made possible by means of a pilot valve arrangement.

This object is achieved by means of a sanitary fitting according to the invention according to claim 1.

Thanks to a specially configured control device, a pilot valve arrangement is always connected hydraulically to at least one supply line connection, through which a liquid is supplied to the sanitary fitting. This means that a liquid pressure is present at all times at the pilot valve arrangement. The pilot valve arrangement permits a user to actuate the sanitary fitting according to the invention with little expenditure of force. Thanks to the easily operated actuating element that is connected to the pilot valve arrangement, the sanitary fitting according to the invention also lends itself particularly well to operation by disabled or elderly people, for example.

Thanks to the effective separation of the "close discharge" and "adjust mixing ratio of the liquid mixture" functions, which is reflected in the two mutually separated functional elements "pilot valve arrangement" and "control device", and to the fact that a pressure is present at all times at the pilot valve arrangement, any period of delay can be reduced between setting a changed mixing ratio and the discharge of a liquid mixture according to the mixing ratio that was changed immediately beforehand.

BRIEF DESCRIPTION OF THE DRAWING

Further, especially preferred embodiments are provided with the characterizing features indicated in the dependent claims.

A preferred embodiment is described below in greater detail with reference to a drawing. Illustrated in the drawing in purely schematic terms are:

FIG. 1 a longitudinal section through a first embodiment of the sanitary fitting according to the invention;

FIG. 2 a longitudinal section along the line II-II passing through the sanitary fitting depicted in FIG. 1;

FIG. 10 a perspective view of an adjustment element of the control device depicted in FIG. 4;

FIG. 11 a perspective view of an intermediate element of the control device depicted in FIG. 4;

FIG. 12 a perspective view of a connection part of the control device depicted in FIG. 4;

DETAILED DESCRIPTION OF PREFERRED EMBODIMENTS

Figure 3:
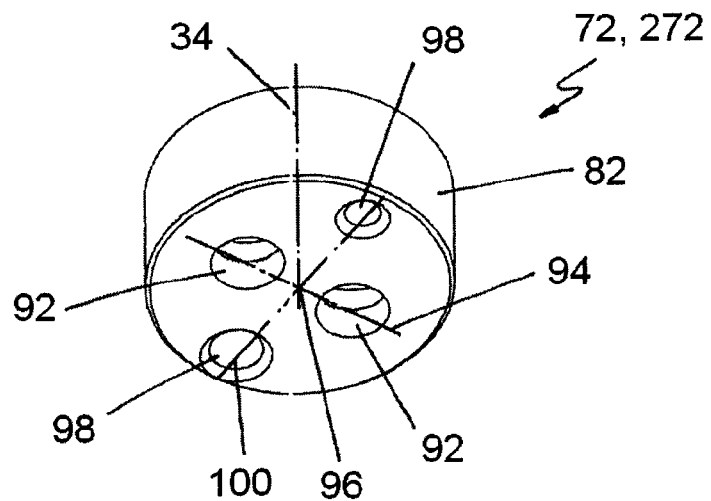
FIG. 3 a perspective view of a connecting part of the sanitary fitting depicted in FIG. 1.

The first embodiment of the sanitary fitting 10 depicted in its installed state in FIG. 1 passes through a duct 14 in a wall 16 in a securing area 12. Alternatively, the designation wall 16 can also be applied to a mounting combination, for example. The sanitary fitting 10 is capable of being fixed to the wall 16 in a non-rotating manner by means of a base sleeve 18 and a union nut 20. The circular cylindrical base sleeve 18 also exhibits on its end face a flange-like sleeve shoulder 22 intended to bear against an upper side 24 of the wall 16, while the union nut 20 is intended to make bearing contact with an under side 26 of the wall 16 facing towards the user.

An externally visible housing 28 of the sanitary fitting 10 exhibits, in addition to the base sleeve 18, an essentially circular cylindrical fitting housing 30, which is connected to the base sleeve 18 in a non-rotating manner in a fixing section 32 facing towards the sleeve shoulder 22. An axis 34 is defined by the cylindrical form of the fitting housing 30.

An outlet 38 for the discharge of a liquid mixture and an actuating element 40 for interrupting the discharge of the liquid mixture are arranged in a free end section 36 of the fitting housing 30 lying opposite the fixing section 32.

The outlet 38 is of tubular configuration and is arranged transversely in relation to the axis 34. It is connected hydraulically to a channel system 44 accommodated in the fitting housing 30.

The actuating element 40 is configured as a push-button 40, which is arranged on the end face of the fitting housing 30 and can execute a lifting movement in the axial direction. In a state of rest (when the sanitary fitting 10 is not in use), a pressure spring 46 connected to the fitting housing 30 forces the actuating element 40 away from the fitting housing 30. In the state of rest, the spring force automatically causes a pilot valve arrangement 48 connected to the actuating element 40, arranged in the channel system 44 of the fitting housing 30 and running coaxially in relation to the axis 34, to interrupt a fluid discharge via the outlet 38. Reference is made to EP-A-1234917 with regard to the design and function of the pilot valve arrangement 48 configured as a lifting valve arrangement.

As can be appreciated from FIG. 1, the pilot valve arrangement 48 is arranged between the outlet 38 and a control device 50 in the hydraulically sealed channel system 44 positioned in the securing area 12.

A hydraulically acting compensator arrangement 52 is arranged additionally in the channel system 44 between the control device 50 and the pilot valve arrangement 48. This serves the purpose of permitting the variable fixed adjustment of a flow cross section. Reference is also made to EP-A-1234917 with regard to the design and function of this compensator arrangement 52. The change in the flow cross section is effected by means of an eccentric element 56, in this case an eccentric screw 56, which prevents a regulating body 58 of the compensator arrangement 52 arranged loosely in the channel system 44 from being displaced in the channel system 44 during operation in a direction of flow 60, that is to say from the control device 50 in the direction of the pilot valve arrangement 48. The eccentric screw 56 is supported for this purpose on the fitting housing 30 and acts on an end face 62 of the regulating body 58. It is evident from FIG. 1 and FIG. 2 that, by rotating the eccentric screw 56 about its screw axis 64, the longitudinal position of the regulating body 58 is adjustable along the axis 34.

The essentially circular cylindrical control device 50, which is also designated as a control cartridge or mixing cartridge, extends coaxially in relation to the axis 34, predominantly in an orifice 66 in the base sleeve 18. The control device 50 is capable of actuation by means of an adjusting element 68 that extends into it, which element is arranged essentially between the base sleeve 18 and the fitting housing 30 and is accessible from outside the sanitary fitting.

The control device 50 is situated at its front end with its input side 70, viewed in the direction of flow 60, bearing against a pill-shaped connecting part 72. The pill-shaped connecting part 72 exhibits a first supply line connection 74 and a second supply line connection 76. The first and second supply line connections 74, 76 are capable of connection in each case for the feed of a first liquid 78 and a second liquid 80 respectively to a first source of liquid and a second source of liquid, although these are not depicted in the Figures.

It is clear from FIG. 1 together with FIG. 3 that the circular cylindrical connection part 72 possesses an external thread 82 on the external side of the housing. By means of this external thread 82, the connecting part 72 is screwed into a corresponding internal thread 84 on the base sleeve 18 in such a way that the control device 50 arranged between the base sleeve 18 and the connecting part 72 is retained in a non-rotating manner in the base sleeve 18. The hydraulic connection of the two supply line connections 74, 76 to the sources of liquid in each case is effected on this occasion via a first supply line 86 and a second supply line 88, preferably via commercially available polyethylene hoses, each of which is secured in each case to the connecting part 72 in a sealing manner by means of a supply line fitting 90 in the form of a "John Guest®" holding element.

FIG. 3 shows that the connecting part 72 is provided at its front end with two receiving bores 92 passing through the connecting part 72 in the axial direction, each being intended to receive one such "John Guest®" holding element 90. The two receiving bores 92 are oriented along a first transverse axis 94, which runs perpendicularly to the axis 34. They are separated from one another by approximately the same distance from an axis centre 96 defined by the axis 34 and the first transverse axis 94. The supply line connections 74, 76 are separated from one another hydraulically in the connecting part 72 and run essentially parallel to the axis 34.

The connecting part 72 additionally exhibits two recesses 98 having different diameters that are not transcurrent in the axial direction, in order to provide protection against rotation with the control device 50. The recesses 98 are arranged along a second transverse axis 100, which also runs perpendicular to the axis 34 but is displaced through 90° in relation to the first transverse axis 94.

The control device 50 has a two-part housing with a housing under part 102 arranged on the inlet side and a housing upper part 104 connected thereto in a non-rotating manner. The housing upper part 104 is arranged on the outlet side. It can be appreciated from FIG. 2 in particular that the housing under part 102 exhibits two projections 108 at its front end providing positive engagement in the recesses 98 in the connecting part 72.

Figure 4:
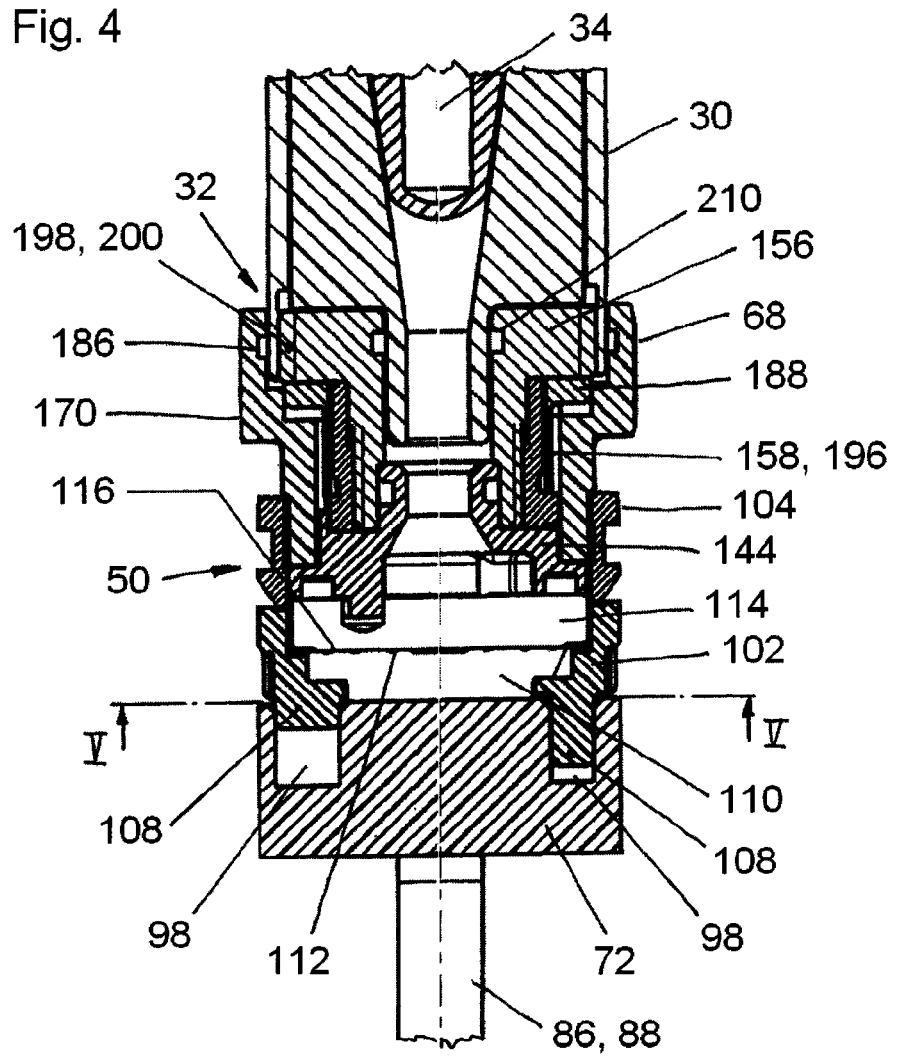
FIG. 4 an enlarged and simplified sectional representation of a control device depicted in FIG. 2.

As illustrated in FIG. 4, a first, ceramic control disc 110 fixed to the housing is mounted with a matching shaped fit in the housing under side 102 of the control device 50. The first control disc 110 in this case exhibits a contact surface 112, which faces away from the connecting part 72. A second, ceramic control disc 114 is in direct bearing contact with this contact surface 112 of the first control disc 110 on the output side, similarly on a further contact surface 116 configured for the purpose. The second, ceramic control disc 114 is mounted in such a way as to be capable of rotation about the axis 34 in the control device 50 within a predetermined angle of rotation 118 between a first end position 120 and a second end position 122 (see FIGS. 5 and 6).

Figure 5:
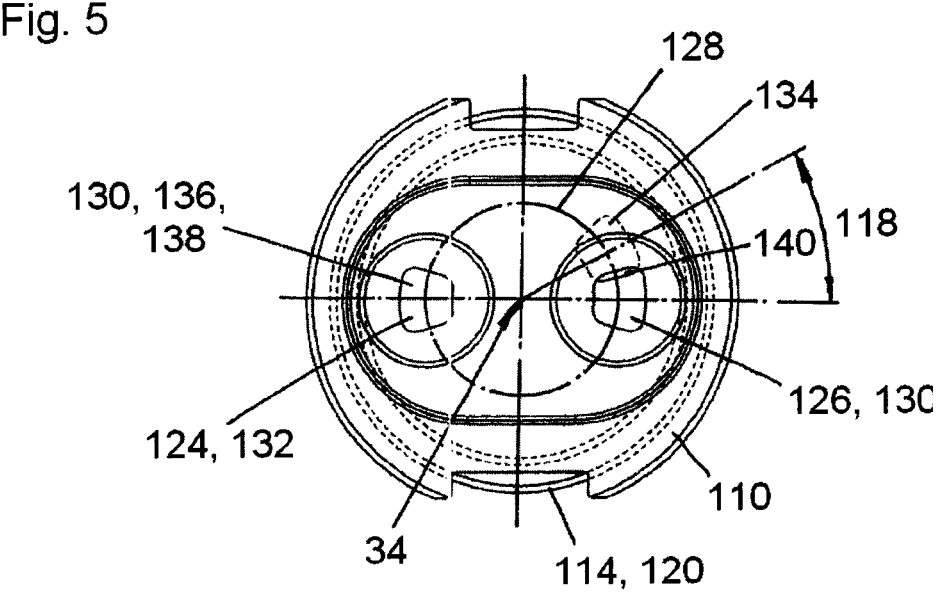
FIG. 5 a simplified sectional representation, rotated through 90°, along the line V-V in FIG. 4, which depicts a first control disc, and a second control disc that is present in a first end position, of the control device depicted in FIG. 4.

FIG. 5 depicts a simplified sectioned view along the line V-V in FIG. 4 with the first and second control disc 110, 114, which are arranged concentrically in relation to the axis 34. The second control disc 114 is in the first end position 120. The first control disc 110 exhibits a first inlet orifice 124 and a second inlet orifice 126, which are arranged diametrically opposite one another in relation to the axis 34 on the circumference of a circle 128 running around the axis 34. Both the first and the second inlet orifices 124, 126 exhibit an essentially trapezoidal cross section 130 with rounded corners.

A number of the contours of the moving second control disc 114 are concealed in FIG. 5 by the first control disc 110 and are accordingly illustrated as a broken line. The second control disc 114 exhibits a first control orifice 132 and a second control orifice 134. These have two trapezoidal further cross sections 136 of essentially the same size and form as those of the inlet orifices 124, 126. The first and the second control orifice 132, 134 are also arranged on the circumference of the circle 128, the second control orifice 134 being displaced about the axis 34 through the angle of rotation 118 in relation to the second inlet orifice 126. The angle of rotation 118 is approximately 60°, although it can vary in a range between about 30° and about 270°.

In the first end position 120 (see FIG. 5), the first control orifice 132 and the first inlet orifice 124 lie essentially one above the other, so that a first flow cross section 138 formed by the first inlet orifice 124 and by the first control orifice 132 is maximal. At the same time, the second inlet orifice 126 and the second control orifice 134 overlap only to a small extent, with the result that a second flow cross section 140 formed by the second inlet orifice 126 and the second control orifice 134 is minimal.

Figure 6:
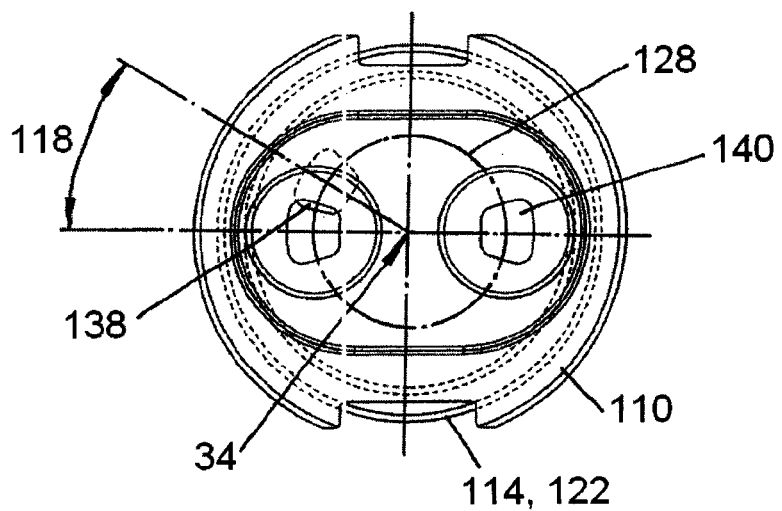
FIG. 6 the sectional representation in an identical depiction to that in FIG. 5, in which the second control disc is in a second end position.

In the condition depicted in FIG. 6, the second control disc 114 is in the second end position 122 in relation to the first control disc 110. In this second end position 122, the second control orifice 134 is positioned essentially congruently above the second inlet orifice 126, so that the second flow cross section 140 is maximal. In this condition, the first flow cross section 138 is minimal.

Figure 7:
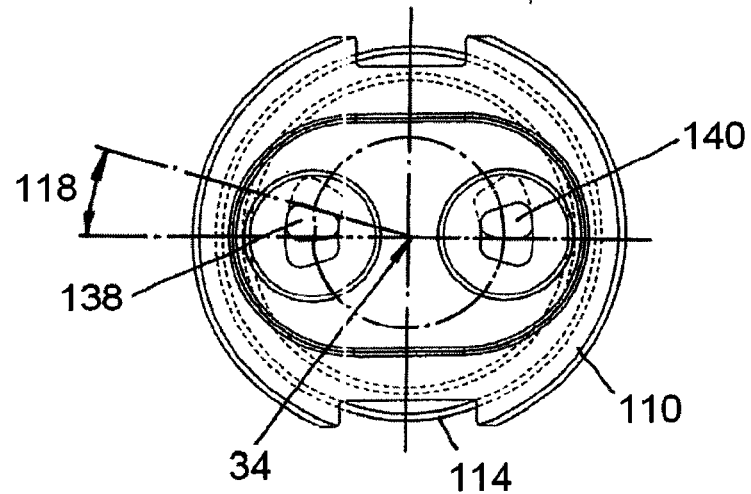
FIG. 7 the sectional representation in an identical depiction to that in FIG. 5, in which the second control disc is present between the first and the second end position.

FIG. 7 depicts the second control disc 114 in an intermediate position between its first end position 120 and its second end position 122. In this position, both flow cross sections 138, 140 are approximately of the same size. The user of the sanitary fitting 10 according to the invention consequently obtains from the outlet 38 a liquid mixture 142 having approximately identical proportions by volume of the first liquid 78 and the second liquid 80 when the actuating element 40 is operated. It is assumed for this purpose that the volumetric flow rate and the pressure of the first liquid 78 is approximately the same as that of the second liquid 80.

When the first supply line connection 74 is connected to a source of liquid for water containing carbon dioxide (carbonated water) and the second supply line connection 76 is connected to a source of liquid for still water (water without carbon dioxide), the user can select the proportions of the two liquids 78, 80 making up the liquid mixture 142 to be discharged by means of the adjusting element 68. When the first control disc 110 is in the first end position 120, it receives essentially carbonated water, and when the first control disc 110 is in the second end position 122, it receives essentially still water.

The fact that both supply line connections 74, 76 in the illustrated embodiment are permanently connected hydraulically to the pilot valve arrangement 48 via the control device 50 in a preferred application, a liquid mixture 142 is always present in the channel system 44 between the control device 50 and the pilot valve arrangement 48 in any relative position of the first control disc 110 in relation to the second control disc 114. In this preferred application, carbonated water with a greater proportion of carbon dioxide is supplied to the first supply line connection 74 from the first source of liquid, whereas still water containing no carbon dioxide or only a small proportion of carbon dioxide is supplied to the second supply line connection 76 from the second source of liquid. In the preferred embodiment of the sanitary fitting, this results in a minimum proportion of carbonated water being present in the channel system 44 between the control device 50 and the pilot valve arrangement 48, including in the second end position 122, so that the user himself will receive essentially carbonated water if, before operating the actuating element 40, he turns the second control disc 114 from the second end position 122 into the first end position 120. The same applies appropriately in the event that the user selects still water.

Determining the relative position of the second control disc 114 in relation to the first control disc 110 between the first end position 120 and the second end position 122 is effected via the aforementioned adjusting element 68. This is positioned in an axial direction between the sleeve shoulder 22 of the base sleeve 18 and the fitting housing 30.

Figure 8:
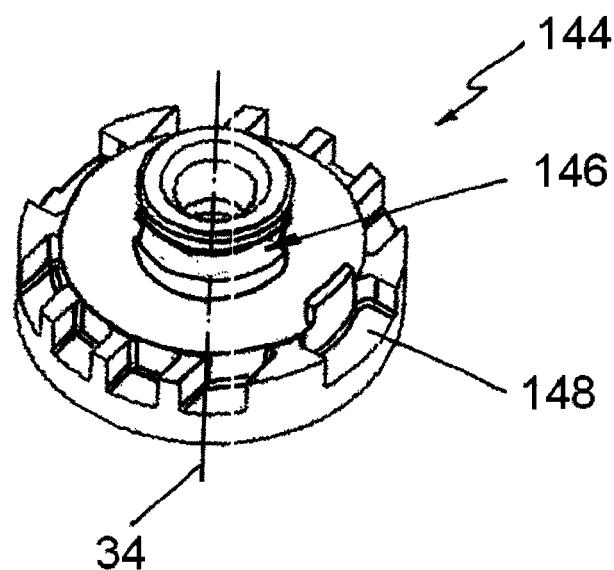
FIG. 8 a perspective view of a driver for the control device depicted in FIG. 4.

As depicted in FIG. 8, the adjusting element 68 extends into a driver 144 of the control device 50, which driver bears against the second control disc 114 in the direction of flow 60 on the outlet side. The bell-shaped driver 144 is connected to the second control disc 114 in a non-rotating manner via a shaped fit and exhibits a driver neck 146 running concentrically with the axis 34 on a side facing away from the second control disc 114. The driver 144 exhibits on its circumference two mutually diametrically opposing recesses 148, into which two driver pins 150 (see FIG. 10) of the adjusting element 68 extend essentially with positive engagement in the installed state. The rotational position of the second control disc 114 in relation to the first control disc 110 is determined in this way (see FIGS. 2 and 4).

The two control discs 110, 114 and the driver 144 are supported axially and radially inside the control device 50 by the housing upper part 104 and the housing under part 102.

Figure 9:
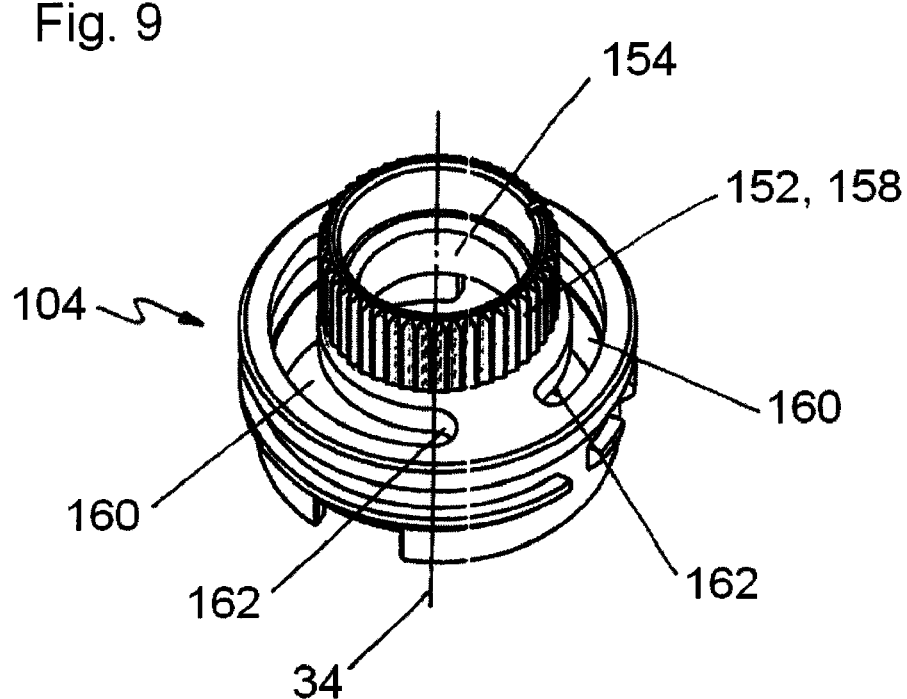
FIG. 9 a perspective representation of a housing upper part of the control device depicted in FIG. 4.

Depicted in FIG. 9 is a circular cylindrical housing collar 152 of the housing upper part 104, which exhibits an internal thread 154 arranged therein. This serves the purpose of connecting a connecting part 156 screwed into it to the base sleeve 18 in a non-rotating manner in the installed state.

FIG. 9 also shows that the housing collar 152 of the housing upper part 104 exhibits circumferential external teeth 158 oriented in the axial direction, and that the housing upper part 104 exhibits, radially outside the housing collar 152, two mutually diametrically opposing kidney-shaped openings 160 running radially about the axis 34, which openings are delimited in the circumferential direction on both sides at an opening end 162 in each case.

These opening ends 162 interact in the circumferential direction with correspondingly formed circumferential end faces 164 of two abutment elements 166 of the adjustment element 68 in the form of a circular ring segment running in each case in an opening 160 corresponding to the bow-shaped openings 160 (see FIG. 10). The opening ends 162 delimit the angle of rotation 118.

Reference is made to EP-B-0616156 with regard to the detailed design of the control device 50, the interaction of its parts and the problem of providing hydraulic sealing.

As can be appreciated in particular from FIG. 10 and FIG. 4, the adjusting element 68 exhibits an essentially circular cylindrical cross section, which reduces radially inwards in the axial direction, so that a radially smaller section 168 is formed as a guide diameter and a radially larger section is formed as an operating section 170. In the installed state, the radially smaller section 168 is oriented towards the control device 50 and the adjusting element 68 is arranged coaxially in relation to the axis 34. A contact shoulder 172 running essentially perpendicular to the axis 34 is arranged at the circumferential transition between the smaller section 168 and the operating section 170 for the purpose of its interaction with the sleeve shoulder 22 of the base sleeve 18. For the purpose of guiding the adjusting element 68 radially on its circumference in the orifice 66 of the sleeve shoulder 22, the adjusting element 68 exhibits a circular cylindrical guide section 174 of the radially smaller section 168 adjoining the contact shoulder 172. A wall thickness 176 of this guide section is approximately the same as that of the abutment element 166 or the driving pin 150. For this reason, all three elements are radially in alignment.

In order to facilitate operation by the provision of an improved grip, the freely accessible operating section 170 is equipped on the external side of the housing with four plane surfaces 178 distributed evenly in the circumferential direction and oriented radially in relation to the shaft 34.

As can be appreciated from FIG. 10 in conjunction with FIG. 4, the adjusting element 68 exhibits radially and internally a first internal guide 180 and, in the radial section 170, a second internal guide 182 displaced radially in relation thereto. The latter is executed with radially greater dimension than the first internal guide 180. The second internal guide 182 extends in the axial direction from an end face 184 of the adjustment element 68 that is free in the direction of flow 60 on the outlet side for up to approximately one half of the operating section 170. It also exhibits a first annular groove 186 running in the circumferential direction and arranged more or less longitudinally and centrally in the axial direction.

An intermediate element 188 that is depicted particularly clearly in FIG. 11 exhibits a circular cylindrical flange 190 with a circumferential first external guide 192, as well as an annular cylinder section 194 adjoining the flange 190 with internal teeth 196 running in the axial direction. These internal teeth 196 interact with the external teeth 158 of the housing upper part 104, in order to hold the intermediate element 188 in a non-rotating manner on the case upper part 104.

As can be appreciated in particular from FIG. 4 in conjunction with FIG. 12, the fitting housing 30 exhibits an internal thread 198 in the fixing section 32, which thread receives a corresponding connecting thread 200 of the connecting part 156 in conjunction with installation, in order to attach both to one another in a non-rotating manner. It can also be appreciated from FIG. 12 in particular that the essentially circular cylindrical connection part 156 exhibits a collar section 202 that follows the connection thread 200 in the axial direction, but is radially smaller. This collar section 202 is also provided on its circumference with an external thread 204, which serves to produce a non-rotating connection with the housing upper part 104 of the control device 50. Furthermore, a circular cylindrical sealing surface 208 is arranged radially and internally inside the collar section 202 so as to interact with a sealing ring 206 (not illustrated in FIG. 4), which is arranged in an annular groove in the driver neck 146 of the driver 144.

In conjunction with the manufacture of a pre-installation unit, the connecting part 72 with the control device 50 secured thereon in a non-rotating manner continues to be screwed hydraulically into the orifice 66 of the base sleeve 18 on the inlet side of the sanitary fitting 10 according to the invention, in the axial direction of a free end of the base sleeve 18 facing away from the sleeve shoulder 22, until the housing upper part 104 of the control device 50 bears firmly against the sleeve shoulder 22 internally. As a result, the control device 50 is connected to the base sleeve 18 in a non-rotating manner.

The adjusting element 68 is then positioned by introducing the driver pins 150 through the openings 160 in the housing upper part 104 into the correspondingly configured recesses 148 in the driver 144.

Then, in order to reduce any radial free play between the adjusting element 68 and the control device 50, the former is pushed onto the housing collar 152 of the housing upper part 104 in such a way that its internal teeth 196 engage in the external teeth 158 of the housing upper part 104. The cylindrical section 194 of the intermediate element 188 is now guided on its circumference essentially two-dimensionally internally on the guide section 174, the abutment elements 166 and the driver pins 150 of the adjusting element 68. The first external guide 192 is guided on its circumference in the first internal guide 180 of the adjusting element 68.

In order to improve the hydraulic sealing, the circular cylindrical, radially internally located sealing surface 208 of the connection part exhibits a circumferential, second annular groove 210 configured as an internal groove. An o-ring seal (not illustrated in FIG. 4) is capable of being introduced into this second annular groove 210.

Finally, the connection part 156 with the fitting housing 30 attached thereto is screwed into the internal thread 154 of the housing upper part 104 until the connection part 30 is fixed to the control device 50 in a non-rotating manner.

In conjunction with the installation of the resulting pre-installation unit on the wall 16, this is pushed with its base sleeve 18 from the upper side 24 of the wall 16 in the direction of the under side 26 until the sleeve shoulder 22 bears against the upper side 24. The desired orientation of the outlet 38 in the circumferential direction in relation to the axis 34 on the wall 16 is then produced before tightening the union nut 20.

Figure 13:
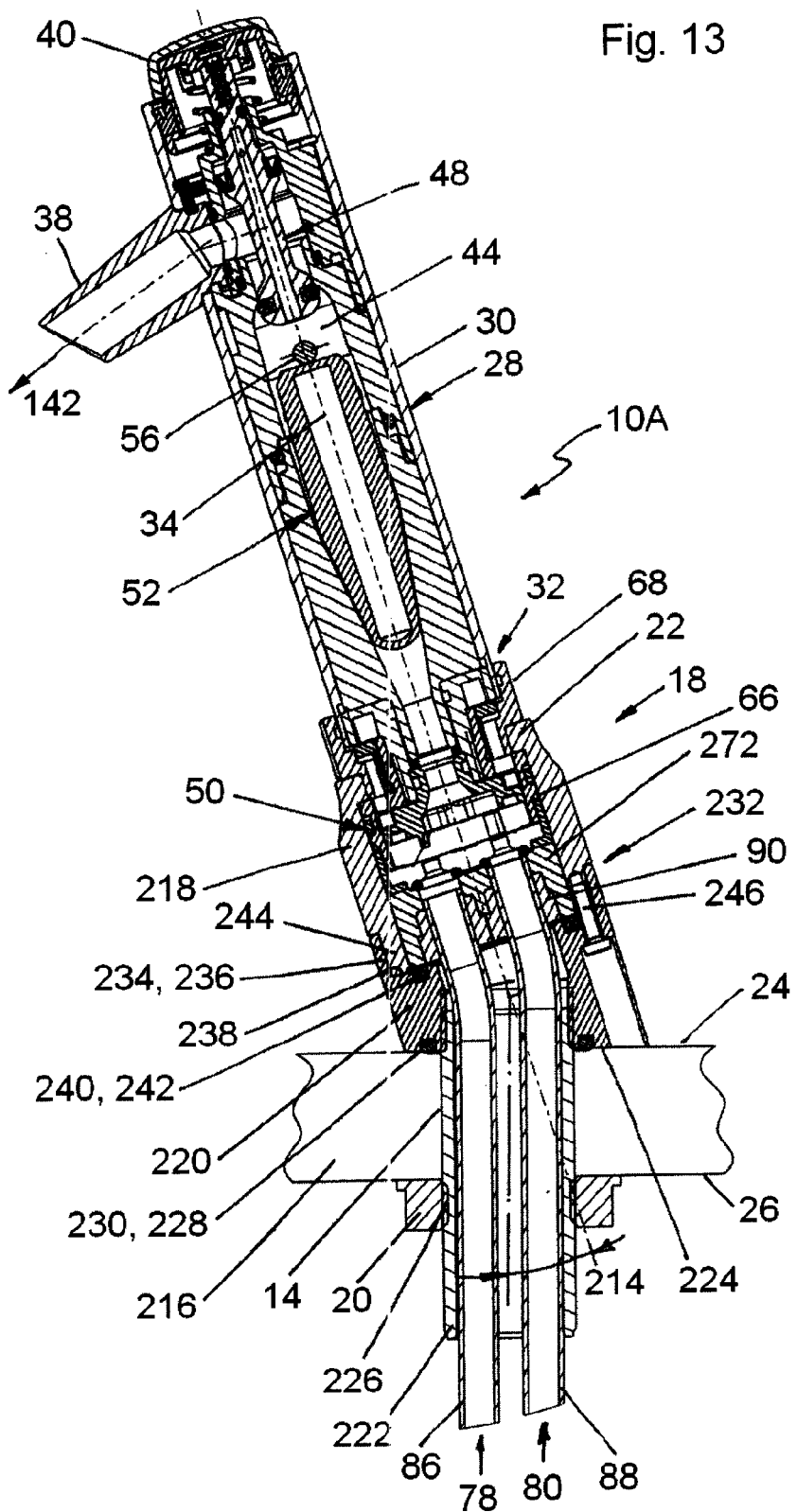
FIG. 13 a longitudinal section through a second embodiment of the sanitary fitting according to the invention.

FIG. 13 depicts a perpendicular or forward-inclined, upright, second embodiment 10A of the sanitary fitting according to the invention in an installed state. The second embodiment 10A differs only partially from the first embodiment 10 of the sanitary fitting according to the invention, for which reason only the differences from the first embodiment 10 are explained below. These differences can be found essentially in the orientation of the outlet 38 and in the securing area 12.

The use of a pre-installation unit of the outlet 38 that is identical with the first embodiment 10 of the sanitary fitting means that this is retained only in a second relative position on the fitting housing 30. The outlet 38 is rotated through 180° in its receiving opening by comparison with the first embodiment 10 of the sanitary fitting.

The axis 34 defined by the fitting housing 30 also no longer runs essentially at right angles, but at a particular angle of inclination 214 in relation to a work surface 216. The work surface 216, for example, may alternatively be a wash stand, a rinsing stand or a mounting combination. The fitting housing 30 is capable of inclined attachment to the work surface 216 at the angle of inclination 214, in order to simplify the drawing of the liquid mixture 142. The angle of inclination 214 in this case lies in a range between 0° and 45° and is approximately 15° in the embodiment depicted in FIG. 13.

The base sleeve 18 of the second embodiment 10A of the sanitary fitting differs from that of the first embodiment 10 of the sanitary fitting in that it is of multi-part configuration and comprises a receiving part 218, an angle part 220 and a fixing part 222. The angle part 220 essentially exhibits the form of an obliquely truncated cylinder, of which the oblique side 224 in the installed state bears against the upper side 24 of the work surface 216. The fixing part 222 is screwed into the angle part 220 from the oblique side 224 in order to form a non-rotating connection and exhibits an external thread 226 on its circumference intended to interact with a union nut 20 corresponding to the first embodiment 10.

In order to seal the angle part 220 against the upper side 24 of the work surface 216, the oblique side 224 of the angle part 220 exhibits a third annular groove 228 running radially around the fixing part 222 intended to receive an o-ring seal 230.

A connection side 232 of the angle part 220 that is so arranged as to lie opposite the oblique side 224 is provided with a stepped bore 234. A depression 236 in the angle part 220 on the outlet side viewed in the direction of flow 60 produced by the stepped bore 234 is equipped with a stepped shoulder 238 running essentially perpendicular to the axis 34. The stepped shoulder 238 exhibits in the axial direction a radially circumferential fourth annular groove 240 intended to receive a further o-ring seal 242.

In place of the external thread for the union nut 20, the receiving part 218 of the base sleeve 18 in the second embodiment 10A exhibits on the inlet side a peg-shaped projecting part 244, which is dimensioned so as to correspond to the depression 236 in the angle part 220. Radial guiding of the receiving part 218 in the angle part 220 is assured in this way.

Because the connecting part 272 in the pre-installation unit of the second embodiment 10A of the sanitary fitting according to the invention does not exhibit an external thread 82, it can only be inserted into the orifice 66 of the base sleeve 18 and the receiving part 218. Otherwise, the connecting part 272 is of identical construction to the connecting part 72.

In conjunction with the manufacture of a pre-installation unit for the second embodiment 10A of the sanitary fitting according to the invention, the connecting part 72 with the control device 50 secured thereon in a non-rotating manner continues to be inserted in the axial direction to the free end of the receiving part 218 until the housing upper part 104 of the control device 50 lies loosely against the sleeve shoulder 22 internally, although it still permits rotation of the control device 50 relative to the receiving part 218 about the axis 34.

The orientation of the outlet 38 of the pre-installation unit of the second embodiment 10A preferably takes place before the installation of the sanitary fitting 10A on the work surface 216. For this purpose, a connecting screw 246 that is accessible from the oblique side 224 of the angle part 220, which connecting screw connects the angle part 220 and the receiving part 218 of the base sleeve 18 to one another, is not tightened until the outlet 38 is oriented on a plane in relation to a predetermined point (not illustrated here). This plane is defined by the oblique side 224 of the angle part 220. By tightening the connecting screw 246, the receiving part 218 and the angle part 220 are connected to one another in a non-rotating manner, and the control device 50 and the connecting part 72 are retained in a non-rotating manner between the sleeve shoulder 22 of the receiving part 218 and the stepped shoulder 238 of the angle part 220 in the axial direction.

For reasons of accessibility, it is recommended to prepare the first supply line 86 and the second supply line 88 in advance for the attachment of the sanitary fitting of the second embodiment 10A to the work surface 216.

The lateral orientation of the second embodiment 10A of the sanitary fitting according to the invention on the work surface 216 is completed by tightening the union nut 20.

The choice of material for the individual component parts of both embodiments 10, 10A of the sanitary fitting according to the invention depends essentially on whether the component parts are in direct contact with the first or the second liquid 78, 80 and the resulting liquid mixture 142. Plastics or stainless steel are suitable for component parts that are in direct contact with liquids 78, 80, 142.

The adjusting element 68 is made of plastic, for example of polyamide, and preferably of polyoxymethylene (POM), although a metal embodiment is also conceivable.

The fitting housing 30 is preferably made of stainless steel. The use of chromium-plated brass is also possible, however.

The outlet 38 and the base sleeve 18, and their respective receiving part 218 and angle part 220, are made of plastic or stainless steel, and preferably of chromium-plated acryl nitrile butadiene styrene (ABS) or polyoxymethylene (POM), whereas the fixing part 222 and the connection part 156 are preferably made of brass, although they are not chromium-plated.

Of course, the use of conventional line connections, for example threaded nipples, is conceivable in place of the supply line fittings 90 described here.

It is also conceivable for the form of the fitting housing 30 to be of a different configuration, on condition that its function is maintained and the adjusting element remains accessible from the outside.

It is possible, moreover, to dispense with the intermediate element 188, yet without significant impairment of the function of the sanitary fitting according to the invention.

The geometrical forms of the first and second inlet orifices 124, 126, and of the first and second control orifices 132, 134, are of secondary importance because of the function. It is important, on the other hand, for the first and the second flow cross sections 138, 140 to be as free from impediments as possible, that is to say also free from scratches, for example, in order to prevent the undesired degassing of the carbonated water.

It is also conceivable for the second control disc 114 to exhibit only a single control orifice, instead of two control orifices 132, 134, if the first and the second inlet orifice 124, 126 of the first control disc are appropriately adapted to one another with regard to their form.

Where an additional need exists to prevent percolating water, for example, from being able to infiltrate into the sanitary fitting 10, 10A between the fitting housing 30 and the adjusting element 68, it is possible to use a further o-ring seal (not illustrated in FIG. 4) in the first annular groove 186.

It is also conceivable for the operating section 170 of the adjusting element 68 not to exhibit any plane surfaces, but rather knurling, for example, or for it to be configured as a polygon, for example as a twelve-sided figure, or for it to be provided radially with a lever. For the purpose of the further improvement of the operating reliability of the operating section 170, it is possible to utilize a rubber-like coating, for example made of caoutchouc, in order to prevent the user's hand from slipping from the adjusting element 68.

In a preferred embodiment, both the first and the second liquids 78, 80 are supplied in a refrigerated state to the supply line connections 74, 76 in each case.

In a further application, two liquids 78, 80 of different qualities containing carbon dioxide, for example mineral water or water enriched or flavored with carbon dioxide, and flavored water, can also be supplied to the sanitary fitting according to the invention.

In a further application, two essentially carbon dioxide-free liquids 78, 80 of different qualities, for example treated, filtered mains water and flavored water, can also be supplied to the sanitary fitting according to the invention.

The invention claimed is:

1. A sanitary fitting having an outlet and a first supply line connection connected hydraulically thereto and the first supply line connection is capable of being connected to a first source of liquid, a pilot valve arrangement arranged hydraulically between the first supply line connection and the outlet, and a second supply line connection capable of being connected to a second source of liquid, wherein a control device is connected on an inlet side by hydraulic means to the first and the second supply line connection and on an outlet side by hydraulic means to the pilot valve arrangement, and the pilot valve arrangement is permanently connected by hydraulic means via the control device to at least the first supply line connection or the second supply line connection.

2. The sanitary fitting as claimed in claim 1, wherein the control device and the pilot valve arrangement are accommodated in a fitting housing of the sanitary fitting, wherein a first ceramic control disc with a first inlet orifice and a second inlet orifice is fixedly mounted, relative to the housing. in the control device on the inlet side, and a second ceramic control disc bearing against the first ceramic control disc with at least one control orifice is mounted on the outlet side, the second ceramic control disc being capable of movement relative to the first ceramic control disc by means of an adjusting element from outside the housing, the first inlet orifice being allocated to the first supply line connection, and the second inlet orifice being allocated to the second supply line connection.

3. The sanitary fitting as claimed in claim 2, wherein the second ceramic control disc is arranged to be capable of being rotated about an axis of the control device between a first end position and a second end position.

4. The sanitary fitting as claimed in claim 3, wherein the adjusting element comprises at least one abutment element for forming the first end position and the second end position.

5. The sanitary fitting as claimed in claim 4, wherein the adjusting element is sleeve-shaped and comprises two abutment elements essentially in the form of a circular ring segment, which are arranged essentially radially opposite one another in relation to the axis and that extend into the control device for the purpose of interacting with the second ceramic control disc.

6. The sanitary fitting as claimed in claim 1, wherein the pilot valve arrangement is permanently connected by hydraulic means via the control device to the first supply line connection and the second supply line connection, a second ceramic control disc comprising a first control orifice and a second control orifice, wherein a first flow cross section formed by a first inlet orifice and by the first control orifice is a maximum in a first end position, wherein a second flow cross section formed by a second inlet orifice and by the second control orifice is a minimum, and the second flow cross section is maximal in a second end position, the first flow cross section is minimal in the second end position.

7. The sanitary fitting as claimed in claim 1, wherein the pilot valve arrangement is configured as a lifting valve arrangement, which comprises a valve-closing body for performing a lifting movement, the lifting movement being triggered by a pressure operation of an operating element that is connected to the valve-closing body and acting in a direction of the lifting movement, and hydraulically acting spaces that are capable of being charged with liquid are present for reducing a force required for the pressure operation.

8. The sanitary fitting as claimed in claim 1, wherein a compensator arrangement is arranged hydraulically between the control device and the pilot valve arrangement for a variable fixed adjustment of a size of a flow cross section.

9. The sanitary fitting as claimed in claim 8, wherein the size of the flow cross section is adjustable by means of an eccentric element, supported on the housing and interacting with the compensator arrangement.

10. The sanitary fitting as claimed in claim 8, wherein the size of the flow cross section is adjustable by means of an eccentric screw supported on the housing and interacting with the compensator arrangement.

11. An application for the sanitary fitting as claimed in claim 1 for the control of a carbon dioxide content of a liquid mixture consisting of a first liquid containing carbon dioxide and a second liquid not containing carbon-dioxide to be discharged via the outlet.

* * * * *